United States Patent
Beiler

(10) Patent No.: US 10,538,359 B2
(45) Date of Patent: Jan. 21, 2020

(54) MOBILE WASTE STORAGE DEVICE

(71) Applicant: New Heights LLC, Paradise, PA (US)

(72) Inventor: Aaron Jay Beiler, Gap, PA (US)

(73) Assignee: New Heights LLC, Leola, PA (US)

( * ) Notice: Subject to any disclaimer, the term of this patent is extended or adjusted under 35 U.S.C. 154(b) by 254 days.

(21) Appl. No.: 15/143,847

(22) Filed: May 2, 2016

(65) Prior Publication Data

US 2017/0313504 A1 Nov. 2, 2017

(51) Int. Cl.
*B65D 5/66* (2006.01)

(52) U.S. Cl.
CPC .................. *B65D 5/6647* (2013.01)

(58) Field of Classification Search
CPC ...... B65F 1/0006; B65F 1/1615; B65F 1/002; B65D 88/1681; B65D 88/1612; B65D 88/124; B65D 88/125; B65D 88/126; B65D 88/1668; B65D 88/1675; B65D 90/623; B65D 65/08; B65D 65/06; B65D 5/2066; B65D 5/4283; B65D 5/4287; B65D 5/6611; B65D 5/6602; B65D 5/6605; B65D 5/6647; B65D 5/6673; B65B 7/20

See application file for complete search history.

(56) References Cited

U.S. PATENT DOCUMENTS

| | | |
|---|---|---|
| 403,641 A | 5/1889 | Brown |
| 724,316 A | 3/1903 | McKMorris et al. |
| 821,177 A | 5/1906 | Leue |
| 3,674,073 A * | 7/1972 | Hendon ................. B65D 65/08 248/97 |
| 3,827,471 A | 8/1974 | Gregory et al. |
| 4,006,928 A | 2/1977 | Beugin |
| 4,113,146 A | 9/1978 | Williamson |
| 4,499,599 A | 2/1985 | Polett et al. |
| 5,011,103 A | 4/1991 | Hayes et al. |
| 5,449,083 A | 9/1995 | Dougherty et al. |
| 5,607,237 A | 3/1997 | LaFleur |
| 5,800,067 A | 9/1998 | Easter |
| 6,079,934 A * | 6/2000 | Beale ................. B65D 88/1612 294/68.1 |
| 6,155,772 A * | 12/2000 | Beale ................. B65D 88/1612 294/68.1 |
| 6,742,930 B2 | 6/2004 | Matias |
| 6,874,797 B2 | 4/2005 | Gardenour |

(Continued)

FOREIGN PATENT DOCUMENTS

| | | | |
|---|---|---|---|
| FR | 770531 A * | 9/1934 | ........... B65D 5/3642 |
| WO | 2007081361 A2 | 7/2007 | |

*Primary Examiner* — Glenn F Myers
(74) *Attorney, Agent, or Firm* — Barley Snyder

(57) ABSTRACT

A mobile waste storage device is disclosed. The mobile waste storage device includes a storage body and a pair of cover sections. The storage body includes a waste receiving space and a plurality of body fastener receiving passageways. The pair of cover sections is flexibly attached to the storage body and is extendable over each other when covering the waste receiving space. Each cover section includes a cover fastener receiving passageway extending through an end thereof and positioned to correspond with another cover fastener receiving passageway extending through an opposite cover section and one of the plurality of body fastener receiving passageways when the pair of cover sections overlap to cover the waste receiving space.

10 Claims, 9 Drawing Sheets

(56) References Cited

U.S. PATENT DOCUMENTS

| | | |
|---|---|---|
| 7,798,712 B2 | 9/2010 | Russick |
| 8,202,000 B2 | 6/2012 | Russick |
| 8,485,757 B2 * | 7/2013 | Nomoto .................. E02B 3/127 383/16 |
| 9,403,627 B1 * | 8/2016 | Scott .................... B65D 5/6611 |
| 2003/0235350 A1 | 12/2003 | Richardson, Jr. |
| 2006/0245672 A1 | 11/2006 | Sun |
| 2007/0127852 A1 | 6/2007 | Town et al. |
| 2007/0140598 A1 * | 6/2007 | McGillick, Sr. ... B65D 88/1612 383/22 |
| 2008/0054059 A1 * | 3/2008 | Chadima ................ B65D 5/685 229/125.38 |

* cited by examiner

MOBILE WASTE STORAGE DEVICE

FIELD OF THE INVENTION

The present invention relates to a waste storage device and, more particularly, to a mobile waste storage device.

BACKGROUND

Waste storage devices, including dumpsters and large capacity waste storage bags, are known in the art. Waste storage bags have become increasingly popular due to their mobility; known waste storage bags are relatively lightweight and can be moved via handles attached to the bag, thus enabling a wider range of waste applications than a conventional dumpster. Known waste storage bags, however, do not include a cover or other means of ensuring the waste stays in the bag during movement. The applications of known waste storage bags are thus limited by the user's desire to avoid spilling the already-stored waste. Spillage during movement undermines the purpose of the waste storage bag and increases the time required of the user.

SUMMARY

An object of the invention, among others, is to provide a mobile waste storage device capable of securely enclosing waste material. The mobile waste storage device includes a storage body and a pair of cover sections. The storage body includes a waste receiving space and a plurality of body fastener receiving passageways. The pair of cover sections is flexibly attached to the storage body and is extendable over each other when covering the waste receiving space. Each cover section includes a cover fastener receiving passageway extending through an end thereof and positioned to correspond with another cover fastener receiving passageway extending through an opposite cover section and one of the plurality of body fastener receiving passageways when the pair of cover sections overlap to cover the waste receiving space.

BRIEF DESCRIPTION OF THE DRAWINGS

The invention will now be described by way of example with reference to the accompanying figures, of which.

DETAILED DESCRIPTION OF EMBODIMENT(S)

The invention is explained in greater detail below with reference to embodiments of a mobile waste storage device. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
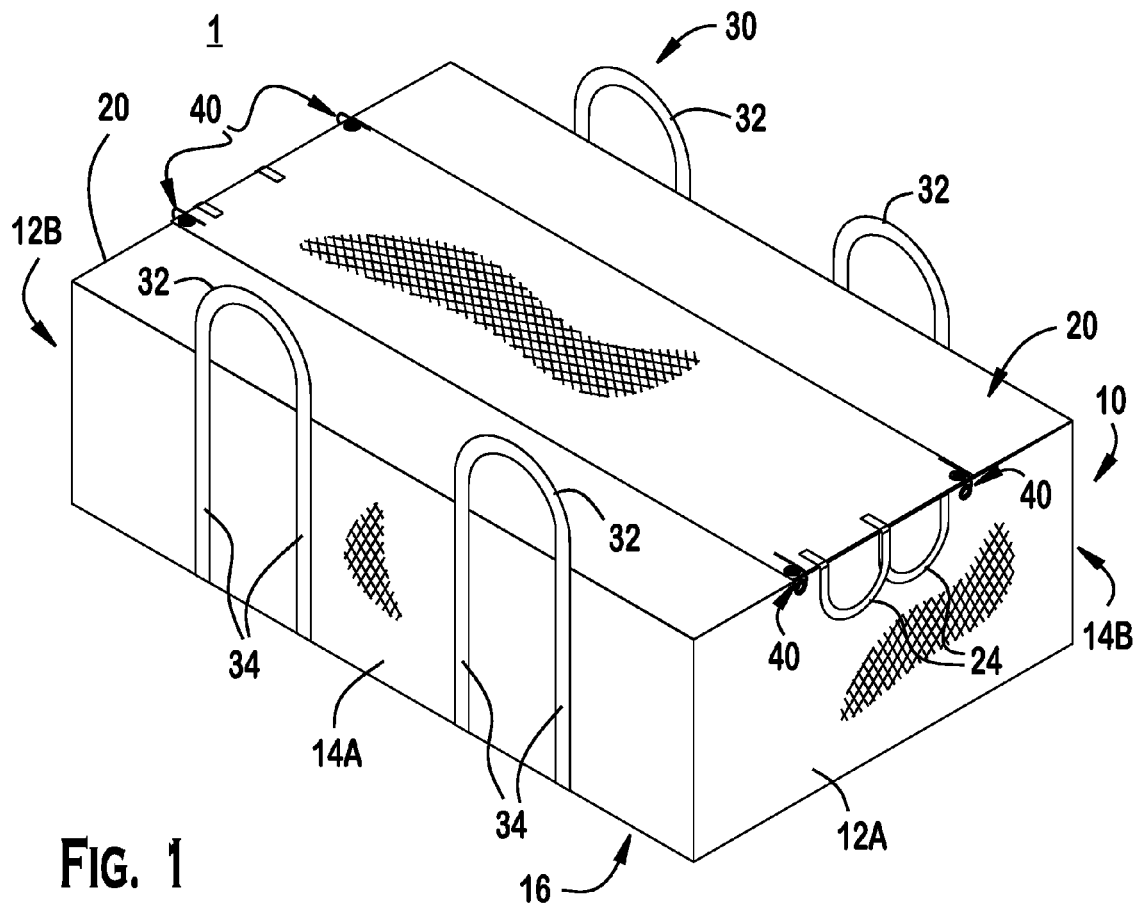
FIG. 1 is a perspective view of a mobile waste storage device according to the invention.

A mobile waste storage device 1 according to the invention is shown in FIG. 1. The mobile waste storage device 1 includes a storage body 10, a pair of cover sections 20, a plurality of grips 30, and a plurality of fasteners 40. The major components of the invention will now be described in greater detail.

Figure 5:
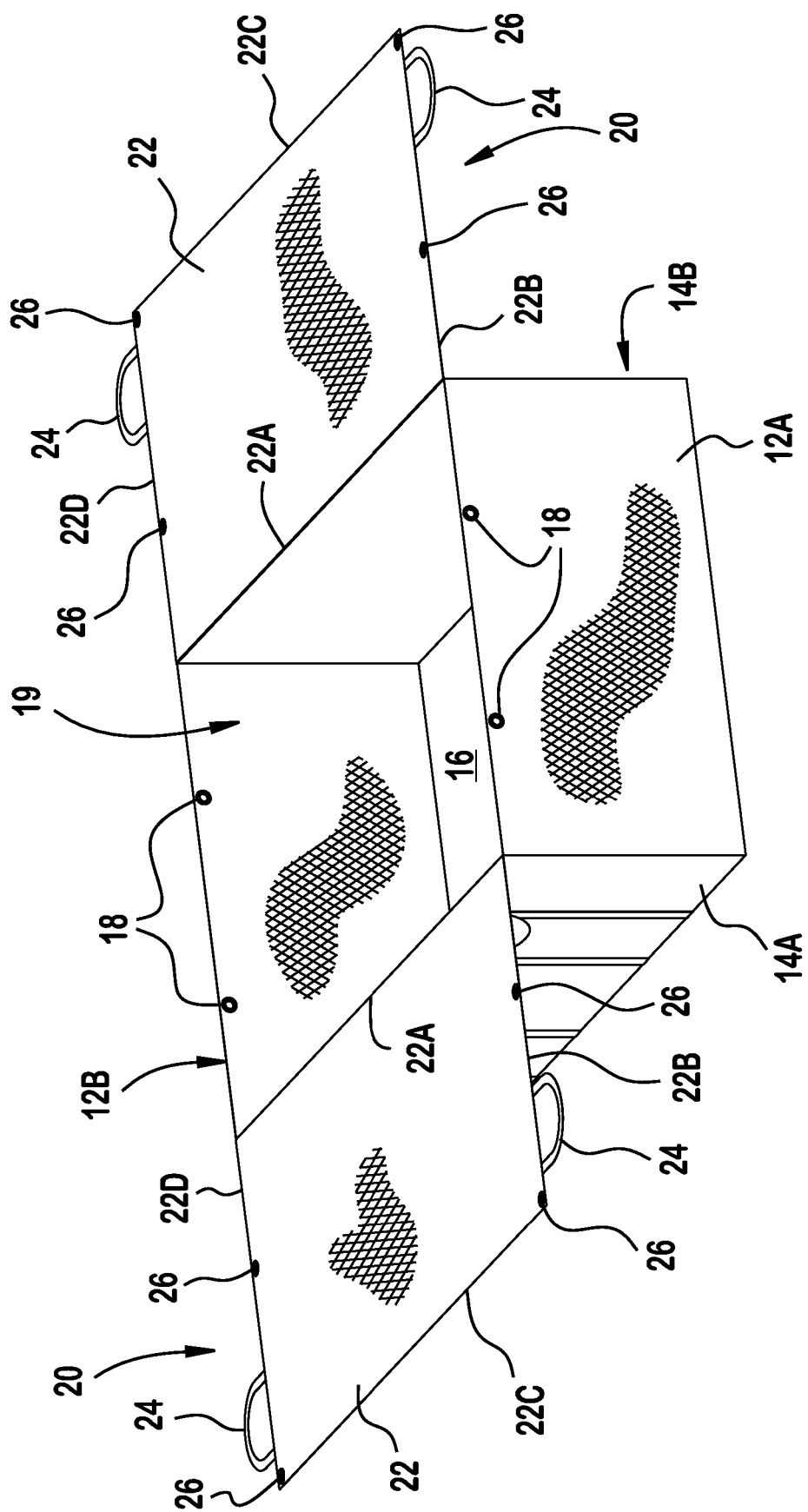
FIG. 5 is a top perspective view of a mobile waste storage device according to the invention.
Figure 6:
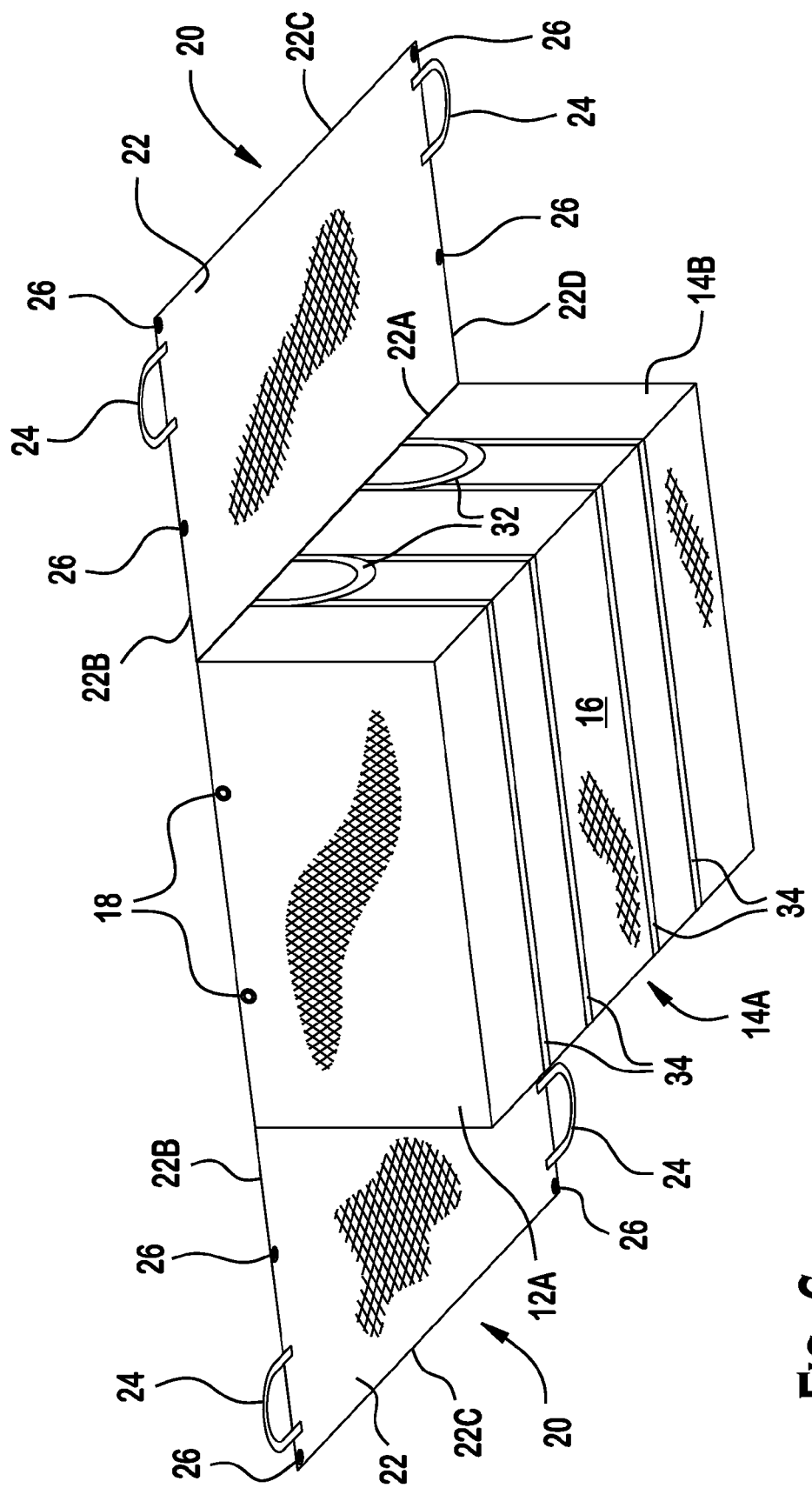
FIG. 6 is a bottom perspective view of the mobile waste storage device of FIG. 5.

The storage body 10, as shown in FIGS. 1, 5, and 6, includes first side panels 12A, 12B, second side panels 14A, 14B, a bottom panel 16, and a plurality of body fastener receiving passageways 18.

The first side panels 12A, 12B are attached at opposite ends of the bottom panel 16. The first side panels 12A, 12B extend parallel to one another and perpendicular to the bottom panel 16. The second side panels 14A, 14B are attached at opposite ends of the bottom panel 16 adjacent and perpendicular to the first side panels 12A, 12B, and extend parallel to one another and perpendicular to the bottom panel 16. The first side panels 12A, 12B and the second side panels 14A, 14B extend the same distance from the bottom panel 16, and are attached to one another to form a waste receiving space 19 there between, as shown in FIG. 5. In the exemplary embodiment shown in FIGS. 1 and 5, the waste receiving space 19 is rectangular parallelepiped shaped, but as would be understood by those with ordinary skill in the art, the waste receiving space 19 could be other shapes including a cube or other known shapes.

The first side panels 12A, 12B, the second side panels 14A, 14B, and the bottom panel 16 may be made from any material capable of supporting high loads known to those with ordinary skill in the art, including a range of metals, plastics, and fabrics. The material of first side panels 12A, 12B, second side panels 14A, 14B, and bottom panel 16 may also be flexible such as a woven polypropylene, woven nylon, or other strong, flexible materials known to those with ordinary skill in the art. The first side panels 12A, 12B, the second side panels 14A, 14B, and the bottom panel 16 may be integrally formed or may be formed individually and assembled to create the storage body 10 with the waste receiving space 19. Additionally, the first side panels 12A, 12B, the second side panels 14A, 14B, and the bottom panel 16 may be attached to one another by stitching, welding, gluing, or other means of attachment known to those with ordinary skill in the art, including fasteners and adhesives.

The body fastener receiving passageways 18 are positioned on and extend through either the first side panels 12A, 12B or the second side panels 14A, 14B, along an edge opposite the bottom panel 16. The body fastener receiving passageways 18 are positioned on the side panels 12A, 12B or 14A, 14B that are not attached to the pair of cover sections 20, as will be described below. In the exemplary embodiment shown in FIGS. 1-6, the body fastener receiving passageways 18 are circular elements incorporated into the side panels 12A, 12B or 14A, 14B. As would be understood by one with ordinary skill in the art, the body fastener receiving passageways 18 may be made of any shape and material, including a plastic or metal material, which forms a passageway extending through the side panels 12A, 12B or 14A, 14B. Also in the exemplary embodiment of FIGS. 1-6, two body fastener receiving passageways 18 are positioned spaced apart on each side panel 12A, 12B or 14A, 14B; as would be understood by one with ordinary skill in the art, the body fastener receiving passageways 18 may vary in number and positioning.

The cover sections 20 are shown in FIGS. 5 and 6. Each cover section 20 has a cover panel 22, a plurality of cover handles 24, and a plurality of cover fastener receiving passageways 26.

The cover panel 22 may include four sides 22A, 22B, 22C, and 22D, with side 22A opposite and parallel to side 22C and side 22B opposite and parallel to side 22D. The cover panel 22, as shown in the exemplary embodiment of FIG. 5, is rectangular, but as would be understood by one with ordinary skill in the art, the cover panel 22 may be a range of other shapes, including a square. The cover panel 22 may be made of any material capable of supporting high loads known to those with ordinary skill in the art, including a range of metals, plastics, and fabrics. The material of the cover panel 22 may also be flexible, such as a woven polypropylene, woven nylon, or other strong, flexible materials known to those with ordinary skill in the art; the cover panel 22 may be the same material as the elements of the storage body 10 described above.

The cover handles 24 are attached to the cover panel 22 at each end of the cover handle 24 to create a loop. The cover handles 24 are positioned on opposite sides 22B and 22D of the cover panel 22, biased toward side 22C as shown in FIG. 5. In the exemplary embodiment shown in FIG. 5, two cover handles 24 are attached to each cover panel 22, one cover handle on each of two opposite sides 22B, 22D, but one with ordinary skill in the art would understand that the positioning and number of the cover handles 24 could vary. The cover handles 24 may be the same material as the cover panel 22, or may be any other material capable of supporting high loads known to those with ordinary skill in the art, including a range of metals, plastics, and fabrics.

The cover fastener receiving passageways 26 are positioned on and extend through the cover panel 22 along opposite sides 22B, 22D. In the exemplary embodiment shown in FIGS. 1-6, the cover fastener receiving passageways 26 are circular elements incorporated into the cover panel 22. As would be understood by one with ordinary skill in the art, the cover fastener receiving passageways 26 may be made of any shape and material, including a plastic or metal material, which forms a passageway extending through the cover panel 22. Also in the exemplary embodiment of FIGS. 1-6, two cover fastener receiving passageways 26 are positioned spaced apart on each side 22B, 22D, with one cover fastener receiving passageway 26 positioned at a corner of each side 22B, 22D and side 22C. As would be understood by one with ordinary skill in the art, the cover fastener receiving passageways 26 may vary in number and positioning.

The plurality of grips 30 are best shown in FIGS. 1 and 6. Each grip 30 is a symmetrical elongated member having a pair of opposite grip ends 32 and a center section 34 connecting the opposite grip ends 32. Each grip 30 may be an elongated closed loop; as shown in the exemplary embodiment of FIGS. 1, 2, 5, and 6, the grip ends 32 may be semicircular shapes and the center section 34 may be a pair of parallel straight members connecting the semicircular grip ends 32. One with ordinary skill in the art would understand that the grip 30, grip ends 32, and center section 34 could be a range of shapes. The grips 30 may be the same material as cover handles 24, or may be any other material capable of supporting high loads known to those with ordinary skill in the art, including a range of metals, plastics, and fabrics.

Figure 3:
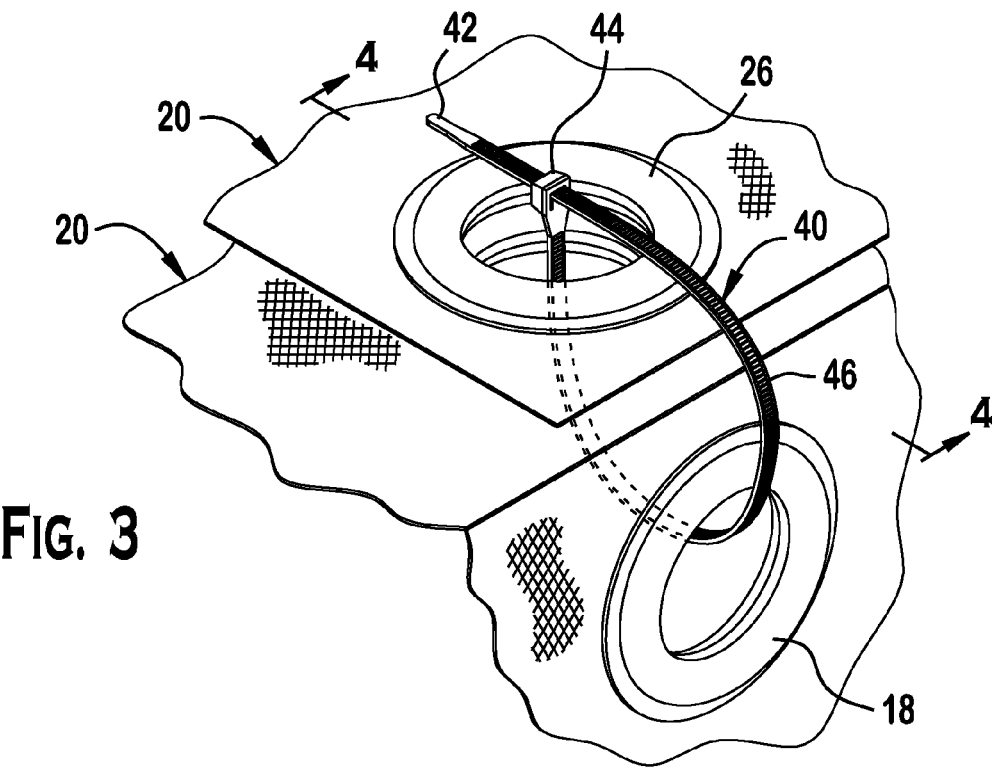
FIG. 3 is a detail view of a fastener, a body fastener receiving passageway, and a plurality of cover fastener receiving passageways of the mobile waste storage device of FIG. 1.
Figure 4:
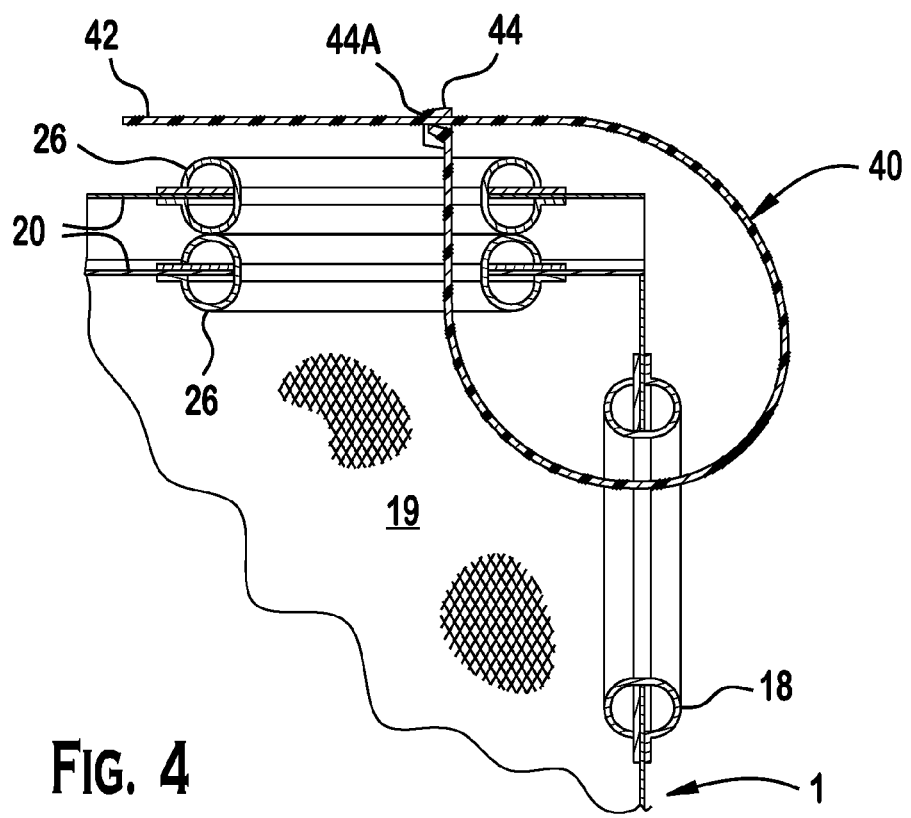
FIG. 4 is a sectional view of the fastener, body fastener receiving passageway, and the plurality of cover fastener receiving passageways, taken along line 4-4 of FIG. 3.

A fastener 40 of the plurality of fasteners 40 is best shown in FIGS. 3 and 4. Each fastener 40 is an elongated member having a first end 42 and an opposite fastening end 44. A first fastening element 44A, as shown in FIG. 4, is disposed on the fastening end 44. The fastener 40 may also have a plurality of second fastening elements 46 disposed along the length of the fastener 40 that securely fasten to the first fastening element 44A. The fastener 40 may be any durable, flexible material known to those with ordinary skill in the art, including a variety of plastics. One with ordinary skill in the art would also understand that the first fastening element 44A and second fastening elements 46 may be a variety of different forms capable of being securely fastened; the fastening connection of the first fastening element 44A and second fastening elements 46 may be disconnectable and re-usable, or disconnection may require destruction of the fastener 40. The fastener 40 may be in the form of a known zip tie.

The assembly of the mobile waste storage device 1 will now be described.

Each cover section 20 is attached from the side 22A to an edge of one of the second side panels 14A, 14B opposite the bottom panel 16. The cover sections 20 are thus disposed opposite of one another on the mobile waste storage device 1, as shown in FIGS. 5 and 6. As would be understood by one with ordinary skill in the art, each cover section 20 could alternatively be attached to first side panels 12A, 12B, in which case the body fastener receiving passageways 18 would be positioned on the second side panels 14A, 14B. Each cover section 20 may be attached to one of the second side panels 14A, 14B by stitching, gluing, welding or other means of attachment known to those with ordinary skill in the art, including fasteners and adhesives. Alternatively, each cover section 20 may be integrally formed with the storage body 10, extending from the top of the second side panels 14A, 14B.

Figure 2:
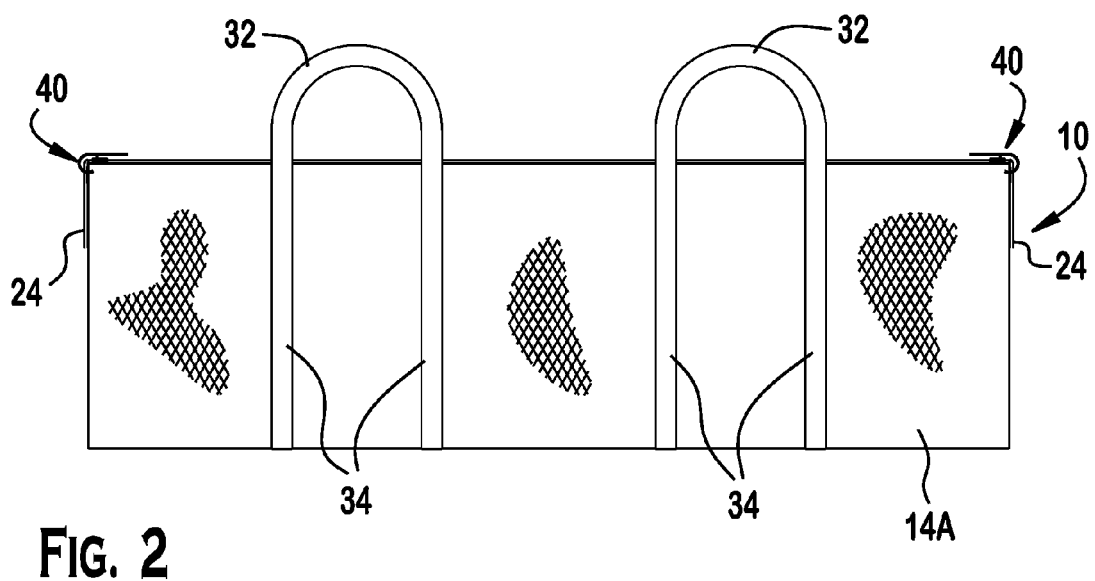
FIG. 2 is a side view of the mobile waste storage device of FIG. 1.

The plurality of grips 30 are disposed around and attached to the second side panels 14A, 14B and bottom panel 16 of the storage body 10, as shown especially in FIGS. 1 and 6. The grips 30 are positioned such that each grip end 32 extends the same distance above the storage body 10, as shown in FIGS. 1 and 2, and the center section 34 is attached to second side panel 14A, bottom panel 16, and opposite second side panel 14B. Each grip 30 may be attached to the second side panels 14A, 14B and bottom panel 16 by stitching, gluing, welding or other means of attachment known to those with ordinary skill in the art, including fasteners and adhesives. In the exemplary embodiment shown in FIGS. 1, 2, 5, and 6, two grips 30 extend around the storage body 10 spaced apart along the length of second side panels 14A, 14B. One with ordinary skill in the art would understand that the number and positioning of the grips 30 could vary.

Now, usage of the mobile waste storage device 1 will be described.

An open position of the mobile waste storage device 1 is shown in FIGS. 5 and 6. In the open position, a user may insert waste or other materials into the waste receiving space 19. The open cover sections 20 are positioned over the grip ends 32 in this position such that the grip ends 32 do not interfere with the waste receiving space 19. When the user is finished filling the waste receiving space 19, the user closes the cover sections 20. The cover sections 20 pivot around side 22A connected to the storage body 10. The user may use the cover handles 24 to aid in pivoting each cover section 20 from the open position shown in FIGS. 5 and 6 to the closed position shown in FIG. 1.

In the closed position, the cover fastener receiving passageways 26 of each cover section 20 overlap and align with one another, as shown in greater detail in FIG. 4. As also shown in FIGS. 1, 3, and 4, a pair of overlapped cover fastener receiving passageways 26 are adjacent to each body fastener receiving passageway 18.

A user may secure the cover sections 20 to the storage body 10 using the fasteners 40. As shown in FIGS. 3 and 4, a first end 42 is threaded through the overlapped cover fastener receiving passageways 26 into the waste receiving space 19, out of the waste receiving space 19 through the body fastener receiving passageway 18, and first fastening element 44A is fastened to second fastening element 46 outside of the mobile waste storage device 1. In the exemplary embodiment shown in FIG. 1, four fasteners 40 are used, corresponding to the number of body fastener receiving passageways 18 and the number of cover fastener receiving passageways 26 on each cover section 20. The fastener 40 creates a durable closed loop securely fastening the cover sections 20 and storage body 10 via the cover fastener receiving passageways 26 and body fastener receiving passageway 18.

The closed and fastened mobile waste storage device 1 is show in FIG. 1. In this position, the grip ends 32 are exposed. A user can move the mobile waste storage device 1 using the grip ends 32, an example of which will be described below. The use of fasteners 40 in the closed position of the mobile waste storage device 1 enables material within the waste receiving space 19 to be reliably contained during movement.

Exemplary uses of the mobile waste storage device 1 will now be described with reference to FIGS. 7-11.

Figure 7:
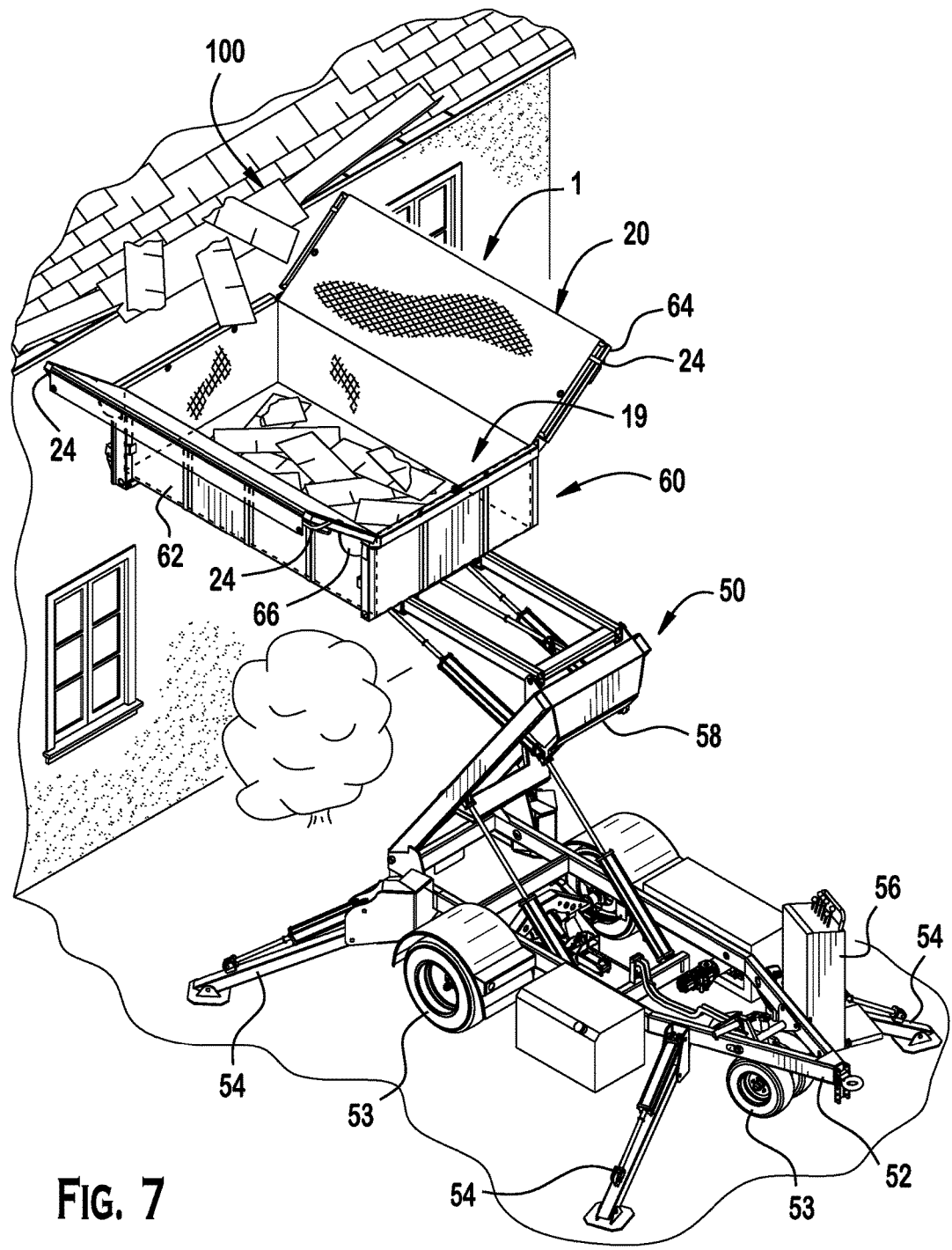
FIG. 7 is a perspective view of a waste management system according to the invention, which uses a mobile waste storage device and a self-propelled trailer.
Figure 8:
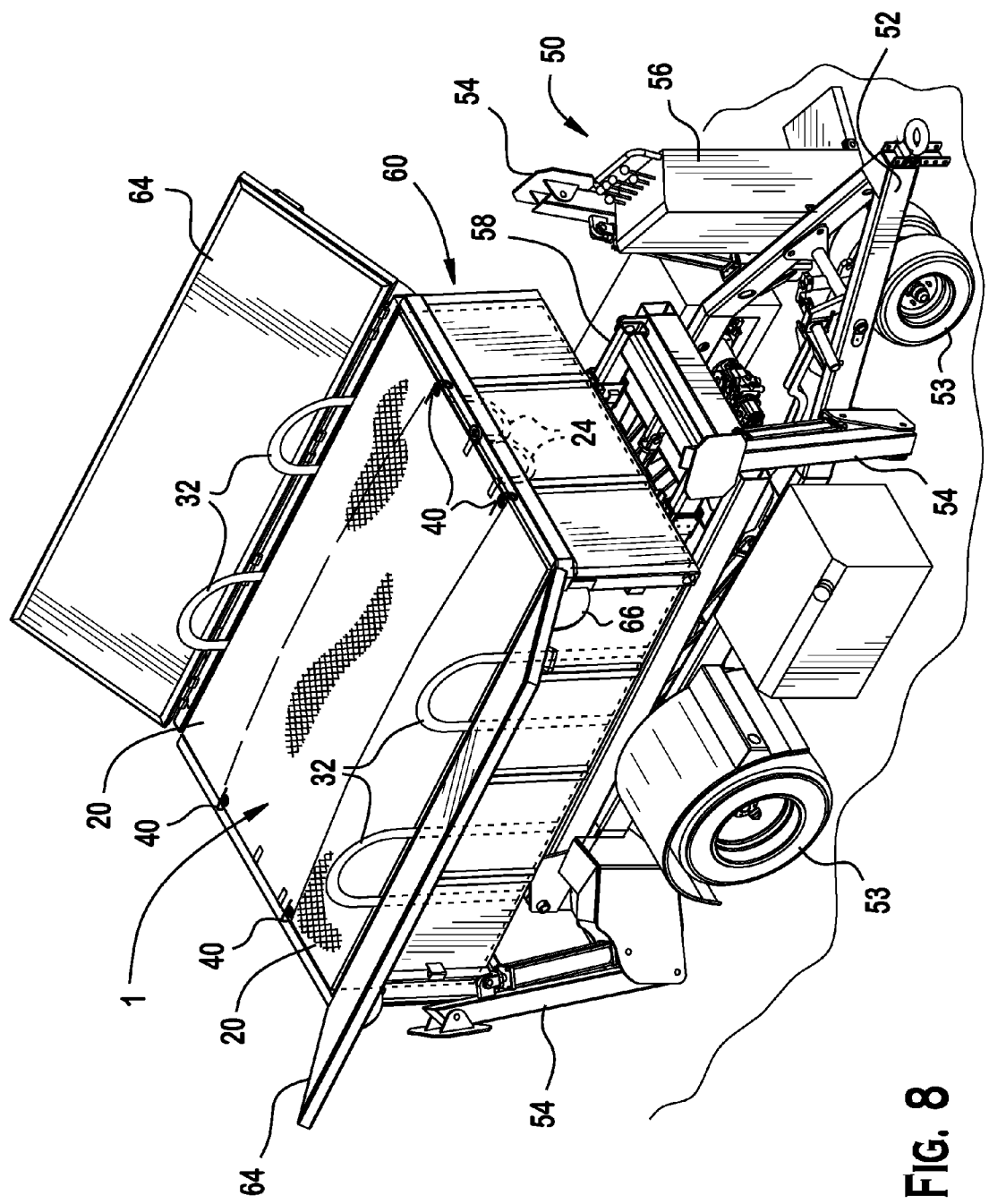
FIG. 8 is a perspective view of the mobile waste storage device and the self-propelled trailer of FIG. 7.
Figure 9:
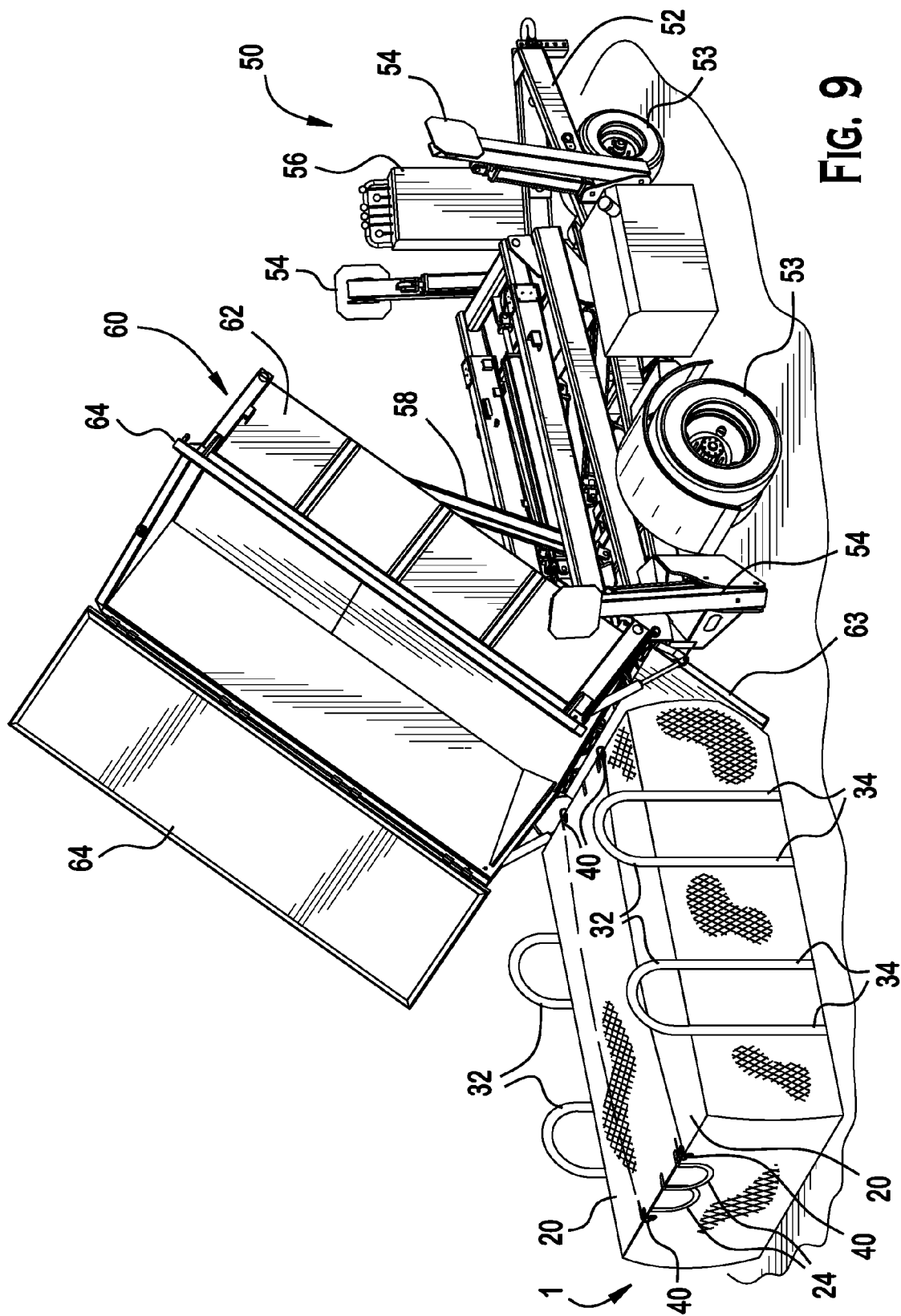
FIG. 9 is a perspective view of the mobile waste storage device and the self-propelled trailer of FIG. 7.

FIGS. 7-9 show the use of the mobile waste storage device 1 with a self-propelled trailer 50 having an extending storage bin 60. The self-propelled trailer 50 has a frame 52, wheels 53, a plurality of stabilizers 54, a drive system 56, and an extension device 58. The plurality of stabilizers 54 may support the frame 52, which is also supported by the wheels 53 and connected to the extension device 58. The drive system 56 is connected to and controls the wheels 53, the stabilizers 54, and the extension device 58.

The storage bin 60 has a bin body 62, a tailgate 63, and a pair of bin cover sections 64. The bin body 62 may be a rectangular parallelepiped with a framed metal structure, but one with ordinary skill in the art would understand that the bin body 62 may be manufactured using different shapes and other materials, such as lumber, composite or a framed metal structure on which a plurality of wood planks are arranged. The tailgate 63 forming one side of the bin body 62 may rotate outward via a hinge connection. Each bin cover section 64 is a planar rectangular structure connected to upper outer edges of the bin body 62 via additional hinges. A pair of stops 66, which determines the angle at which the bin cover section 64 is positioned in an open position, are provided and positioned along a common side at opposite ends of each cover section 64. The storage bin 60 is secured to the extension device 58, for instance, using a mechanical weld. However, one skilled in the art should appreciate that other fastening mechanisms could be used, including, nuts and bolts, screws, and adhesives.

To use the mobile waste storage device 1 with the self-propelled trailer 50 and extending storage bin 60, a user first positions the mobile waste storage device 1 in an open storage bin 60. The mobile waste storage device 1 is positioned such that the storage body 10 and grips 30 fit within the storage bin 60. Each cover section 20 overlaps one bin cover section 64; the stops 66 hold the bin cover sections 64 and cover sections 20 open at an angle with respect to the storage bin 60, as shown in FIG. 7.

In applications in which the waste is not at ground level, such as the roofing tile waste 100 shown in FIG. 7, a user may operate the drive system 56 to position the stabilizers 54 and extend the extension device 58 attached to the storage bin 60. As shown in FIG. 7, a user can then raise and position the open mobile waste storage device 1 in close proximity to the waste 100 for collection.

When the user has finished collecting waste 100, the user may use the drive system 56 to lower the extension device 58 and raise the stabilizers 54, returning the self-propelled trailer 50 and storage bin 60 to the position shown in FIG. 8. A user may then close and secure the mobile waste storage device 1 using the fasteners 40 as described above. In this state, shown in FIG. 8, the secured mobile waste storage device 1 may be transported to a different location by the self-propelled trailer 50 via operation of the drive system 56 and wheels 53. When the user has reached the destination location of the mobile waste storage device 1, the user may offload the mobile waste storage device 1 by using the drive system 56 to open the tailgate 63 and operate a portion of the extension device 58 that tips the storage bin 60. The secured and close mobile waste storage device 1 then slides out of the storage bin 60 at the desired location, as shown in FIG. 9.

Figure 10:
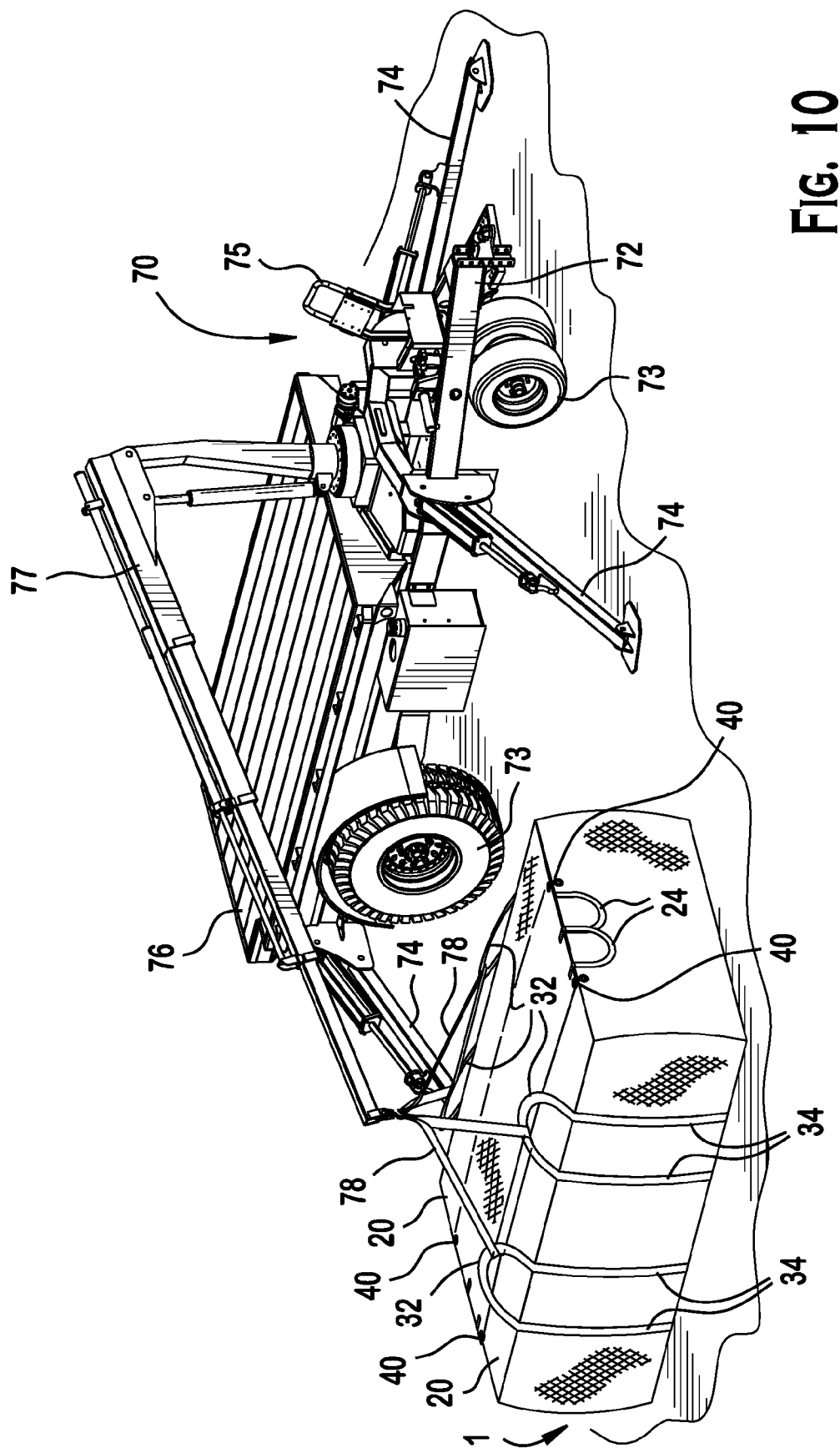
FIG. 10 is a perspective view of the waste management system according to the invention, which uses a self-propelled crane.
Figure 11:
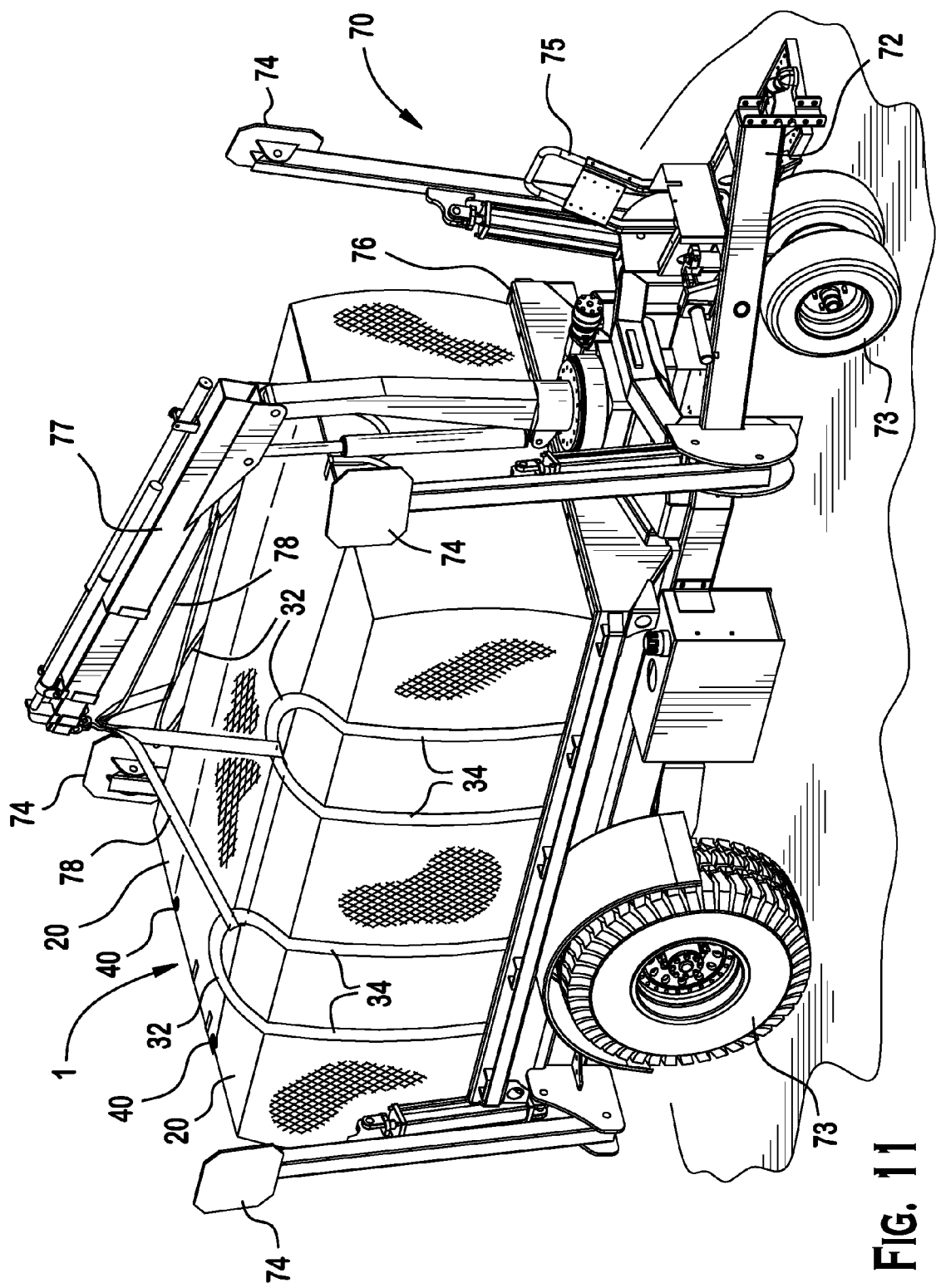
FIG. 11 is a perspective view of the mobile waste storage device and the self-propelled crane of FIG. 10.

FIGS. 10 and 11 illustrate the use of the mobile waste storage device 1 with a self-propelled crane 70. The self-propelled crane 70 includes a frame 72, a plurality of wheels 73, a plurality of stabilizers 74, a control system 75, a flatbed 76, a self-propelled crane arm 77, and a lifting strap 78. The frame 72 may be supported by the wheels 73 or the plurality of stabilizers 74, both of which are connected to and controlled by the control system 75. The frame 72 supports the flatbed 76. The self-propelled crane arm 77 is positioned on the frame 72, and is extendable to reach locations outside the footprint of the self-propelled crane 70. The self-propelled crane arm 77 is also controlled by the control system 75.

A user may use the self-propelled crane 70 to load and relocate the mobile waste storage device 1. When a user has finished loading waste or other materials into the mobile waste storage device 1, as described above, the user closes the cover sections 20 and secures the cover sections 20 to each other and the storage body 10 using the fasteners 40; this results in a closed and secured mobile waste storage device 1 with exposed grip ends 32 as shown in FIG. 1.

In an application in which the closed and secured mobile waste storage device 1 is positioned on the ground, a user may operate the control system 75 to control the wheels 73 and position the self-propelled crane 70 adjacent to the mobile waste storage device 1. The control system 75 may also be used to position the plurality of stabilizers 74 to support the frame 72. A user then positions the lifting strap 78 to extend through the plurality of exposed grip ends 32. Using the control system 75, the user may operate the self-propelled crane arm 77 to attach to a point on the lifting strap 78 which supports the plurality of exposed grip ends 32, as shown in FIG. 10. The user may then operate the self-propelled crane arm 77 to lift and position the mobile waste storage device 1 on the flatbed 76, as shown in FIG. 11. After raising the plurality of stabilizers 74 using the control system 75, the user may operate the wheels 73 to relocate the closed and secured mobile waste storage device 1.

Advantageously, the mobile waste storage device 1 of the present invention permits flexible usage to collect waste and secure containment of waste or other material. In the exemplary embodiments described above, the mobile waste storage device 1 may be lifted, transported, and offloaded without risk of spilling the contained material; these advantages would also extend to other applications involving moving the mobile waste storage device 1.

What is claimed is:

1. A mobile waste storage device, comprising:
   a storage body having a plurality of side panels providing a waste receiving space and a plurality of body fastener receiving passageways positioned through opposite side panels of the plurality of side panels, the plurality of body fastener receiving passageways having:
      a first pair of body fastener receiving passageways facing each other and positioned on the opposite side panels; and
      a second pair of body fastener receiving passageways positioned facing each other and positioned on opposite side panels, the second pair of body fastener receiving passageways positioned adjacent to the first pair of body fastener receiving passageways on the opposite side panels; and
   a first cover section of a pair of cover sections extending from the storage body from one side thereof and having:
      a first pair of first cover fastener receiving passageways positioned and extending through a distal end portion thereof and corresponding and align with the first pair of body fastener receiving passageways; and
      a second pair of first cover fastener receiving passageways extending there through and positioned to correspond and align with the second pair of body fastener receiving passageways; and
   a second cover section of the pair of cover sections extending from the storage body from an opposite side with respect to the first cover and extendable over the first cover section to cover the waste receiving space, the second cover section having:
      a first pair of second cover fastener receiving passageways positioned and extending through a distal end portion thereof and positioned to correspond and align with the second pair of body fastener receiving passageways and the second pair of first cover fastener receiving passageways; and
      a second pair of second cover fastener receiving passageways extending there through and positioned to correspond and align with the first pair of body fastener receiving passageways and the first pair of first cover fastener receiving passageways.

2. The mobile waste storage device of claim 1, further comprising a plurality of fasteners, each fastener extending through one of the first pair of first cover fastener receiving passageways, one of the first pair of body fastener receiving passageways, and one of the second pair of second cover fastener receiving passageways.

3. The mobile waste storage device of claim 2, wherein the storage body is a rectangular body.

4. The mobile waste storage device of claim 1, wherein each of the plurality of fasteners forms a loop enclosing a portion of the first cover section, a portion of the second cover section, and a portion of the one of the plurality of side panels.

5. The mobile waste storage device of claim 4, further comprising a plurality of grips extending from the plurality of cover sections.

6. The mobile waste storage device of claim 5, wherein each of the plurality of grips is an elongated closed loop having a pair of grip ends and a center section.

7. The mobile waste storage device of claim 6, wherein each of the plurality of grips is disposed around and attached to the storage body.

8. The mobile waste storage device of claim 7, wherein grip ends of each of the plurality of grips extend above the storage body in the closed position.

9. The mobile waste storage device of claim 1, wherein the storage body and the pair of cover sections are made from a flexible material.

10. The mobile waste storage device of claim 9, wherein the storage body and the pair of cover sections are made from a polypropylene material.

* * * * *